UNITED STATES PATENT OFFICE.

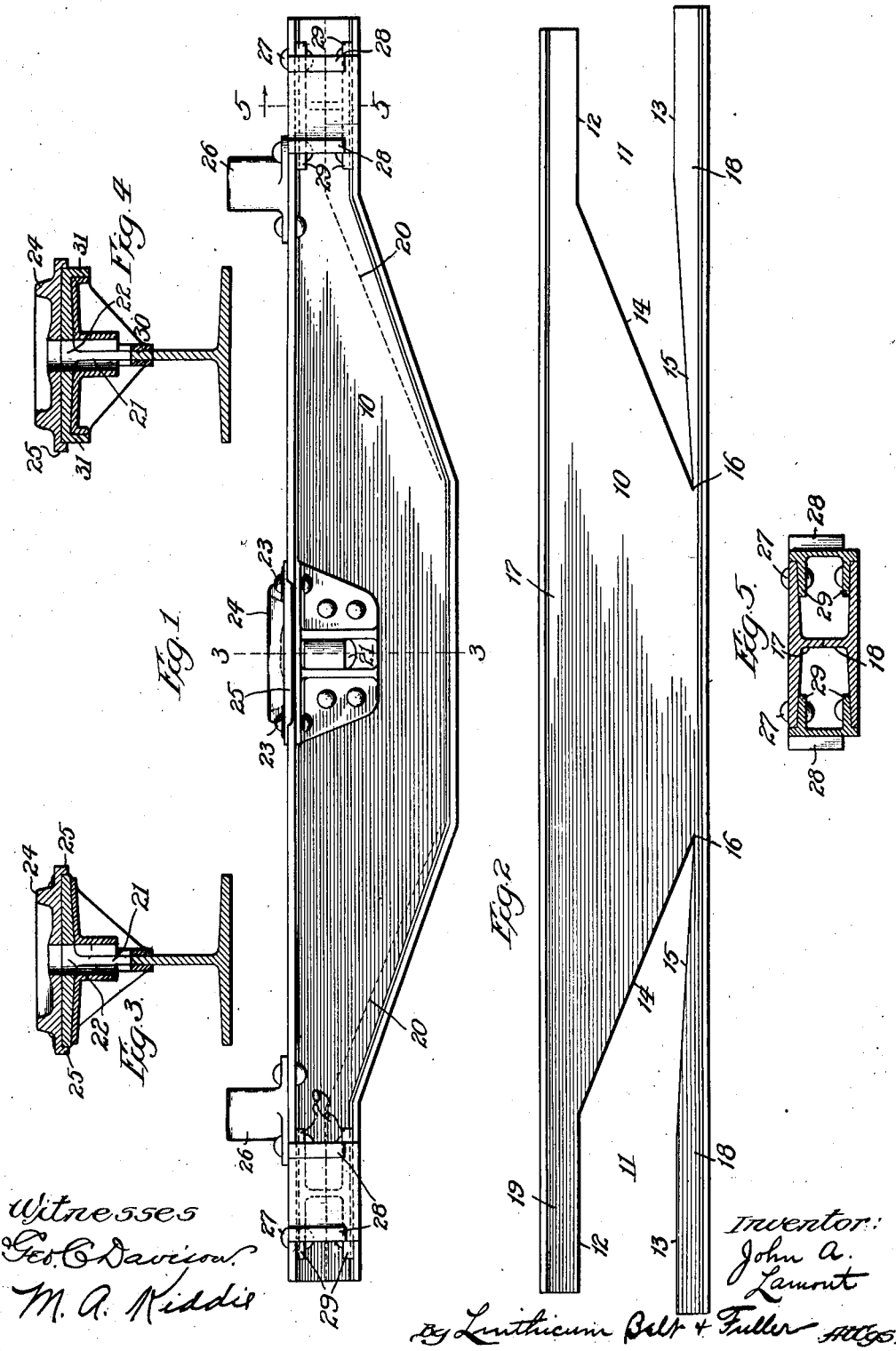

JOHN A. LAMONT, OF GRANITE CITY, ILLINOIS, ASSIGNOR TO AMERICAN STEEL FOUNDRIES, OF NEW YORK, N. Y., A CORPORATION OF NEW JERSEY.

CAR-BOLSTER.

1,031,276.   Specification of Letters Patent.   Patented July 2, 1912.

Application filed August 18, 1909. Serial No. 513,398.

*To all whom it may concern:*

Be it known that I, JOHN A. LAMONT, a citizen of the United States, residing at Granite City, in the county of Madison and State of Illinois, have invented certain new and useful Improvements in Car-Bolsters, of which the following is a specification.

My invention concerns the manufacture of bellied or similar beams, bolsters and the like, preferably from beams of substantially uniform depth, such as the ordinary and usual commercial rolled sections.

The leading object and purpose is, as is obvious, to produce beams or bolsters of this character at small expense from rolled beams readily purchased on the market.

In accordance with the principles and ideas of this invention, I remove or cut out from each end of the web of an ordinary beam a tapered section or part and then bend the beam to bring together the edges thereof produced by the removal of such sections, subsequently welding the edges together, as by an electric arc or other suitable means, thereby forming a beam integral throughout and being of increased depth at its center. Although the welding referred to is effective and produces an efficient union between the parts, nevertheless I usually remove web sections of such shape that the resulting welded edges will be in the neutral plane or axis of the beam so that the joint or seam will be subjected in use to little or no strain.

In the accompanying drawing, which illustrates the method of carrying out this invention, I have shown, in Figure 1, one of the completed bolsters; in Fig. 2, the manner of removing the end web sections is indicated; Fig. 3 is a central cross section on line 3—3 of Fig. 1; Fig. 4 is a similar cross section through a modified form of beam or bolster; and Fig. 5 is a cross section on line 5—5 of Fig. 1.

Reference to the drawing will indicate that from a section of I-beam, or a beam of any of the usual and ordinary cross sections, I cut out tapered end portions from the web 10, leaving at the two ends of the blank the tapered recesses or apertures 11, 11, the margins of the outer portions of which, 12 and 13, are substantially parallel, while the margins of the inner portions of the same, 14 and 15, converge and meet at the apex or point 16. The ends of this beam blank 17 are cut so that after the removal of the sections indicated, the lower strips 18 will be somewhat longer than the corresponding parallel upper strips 19, whereby when these lower portions are bent to place the ends of both parts will be in substantially the same line as indicated in Fig. 1. After these end sections have been cut out from a beam of substantially uniform depth, and preferably of any suitable commercial rolled section, the parts 18 are bent so as to bring the edges 13 and 15 into engagement with the opposite edges 12 and 14, and subsequently these edges are welded together by the employment of an electric arc which is caused to travel over the same, or by the use of any other suitable welding means. In Fig. 1, the dotted lines 20 indicate the joints or seams produced by such union or welding of these edges, and it should be noted that the shapes of the parts cut out from the web are preferably so chosen that the seams or joints 20, at least for a portion of their length, will coincide with the neutral axis of the finished beam. At its center, the upper part of the web 10 is cut away at 21 for the accommodation of the king pin, the oppositely projecting, top marginal flanges of the beam being also centrally apertured at 22 to receive such pin, and to this central part of the bolster I fasten, by means of rivets 23 or otherwise, a center plate or bearing 24 of the usual or any suitable construction, the same desirably having outer marginal flanges 25 overlapping the edges of the beam, as is shown clearly in Figs. 1 and 3. The top flanges of this bolster also have secured thereto near their ends side bearings 26, and the bolster at its sides has secured thereto, by means of rivets 27 (Fig. 5) passing through the top and bottom flanges of the bolster, column guides 28, each of which has a pair of inwardly extended flanges or ribs 29, through which these rivets also pass for the proper securing and efficient holding of the side column-guides in position.

In some instances it may be desirable to provide the top flange of the bolster with downwardly extending, marginal stiffening flanges, and I have therefore indicated in Fig. 4 a cross section of a specially formed beam 30 of substantially I-shape, having at its top downwardly extended, marginal flanges 31, this beam being susceptible of modification into the bellied form shown in Fig. 1 by the method of cutting and welding hereinabove indicated. In other respects the finished bolster of Fig. 4 would be substantially like that of Fig. 1.

This invention, it is to be understood, is not to be limited to the precise constructions and features herein indicated except to the extent required by the scope of the appended claims, it being apparent that the invention is susceptible of a large variety of uses and of a considerable number of modifications without departure from its heart and substance.

I claim:

1. A bellied metal beam, bolster or the like, having a bellied web, a longitudinal seam extending inwardly from one end thereof, and an oblique seam leading inwardly from the inner end of the longitudinal seam and inclined downwardly toward and terminating adjacent the bottom of the bellied portion of the beam, substantially as described.

2. A bellied beam formed of a rolled metal flanged shape having its web portion integral and unbroken throughout its entire reduced end portions, each reduced end portion having a welded longitudinal seam extending inwardly from the outer end of said portion and a welded oblique seam leading inwardly from the inner end of the longitudinal seam and inclined toward and terminating adjacent the bottom of the bellied portion of the beam, substantially as described.

JOHN A. LAMONT.

Witnesses:
E. B. Sherzer,
Jas. H. Louie.